(12) United States Patent  (10) Patent No.: US 8,572,400 B2
Lin et al. (45) Date of Patent: Oct. 29, 2013

(54) ENHANCED DIGITAL RIGHT MANAGEMENT FRAMEWORK

(75) Inventors: Yunbiao Lin, Shanghai (CN); Jie Yang, Shanghai (CN); Chuan Song, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 12/532,143

(22) PCT Filed: Mar. 26, 2007

(86) PCT No.: PCT/CN2007/000970
§ 371 (c)(1),
(2), (4) Date: Mar. 3, 2010

(87) PCT Pub. No.: WO2008/116346
PCT Pub. Date: Oct. 2, 2008

(65) Prior Publication Data
US 2011/0035577 A1    Feb. 10, 2011

(51) Int. Cl.
*H04L 29/06* (2006.01)
(52) U.S. Cl.
USPC .............................. 713/189; 713/155; 726/26
(58) Field of Classification Search
USPC ...................... 713/155, 189; 705/51
See application file for complete search history.

(56) References Cited

U.S. PATENT DOCUMENTS

| 7,130,426 | B1 | 10/2006 | Cha et al. |
| 7,406,603 | B1* | 7/2008 | MacKay et al. ............. 713/193 |
| 2002/0184501 | A1* | 12/2002 | Bin Abdul Rahman et al. ............................. 713/173 |
| 2004/0059938 | A1* | 3/2004 | Hughes et al. ................ 713/200 |
| 2004/0127196 | A1* | 7/2004 | Dabbish et al. ............... 455/411 |
| 2006/0031173 | A1* | 2/2006 | Rajaram ........................ 705/64 |
| 2006/0064596 | A1* | 3/2006 | Feinleib et al. ............... 713/176 |
| 2006/0215220 | A1* | 9/2006 | Yamahara et al. ........... 358/1.15 |

(Continued)

FOREIGN PATENT DOCUMENTS

| CN | 1801727 A | 7/2006 |
| EP | 1378104 A | 1/2004 |
| WO | WO-2008/116346 A1 | 10/2008 |

OTHER PUBLICATIONS

Devanbu, "Research directions for automated software verification: using trusted hardware", 1997, IEEE, p. 274-279.*

(Continued)

*Primary Examiner* — Taghi Arani
*Assistant Examiner* — Gregory Lane
(74) *Attorney, Agent, or Firm* — Barnes & Thornburg, LLC

(57) ABSTRACT

Machine-readable media, methods, apparatus and system for enhanced digital right management framework are described. A server platform may receive a request of downloading content and first attestation information from a client platform. The server platform may examine if the client platform attests to a client platform characteristic that affects integrity of the client platform by using the attestation information, and then encrypt and download the content to the client platform if the client platform attests to the client platform characteristic. The server platform may further receive a request of viewing the content and second attestation information from the client platform. The server platform may then examine if the client platform attests to its integrity by using the second attestation information; and then send a content key to the client platform if the client platform attests to its integrity, so that the client platform can decrypt and view the content.

11 Claims, 4 Drawing Sheets

(56) References Cited

U.S. PATENT DOCUMENTS

2007/0174198 A1\* 7/2007 Kasahara et al. ............... 705/51
2008/0098212 A1\* 4/2008 Helms et al. .................. 713/155
2008/0282348 A1\* 11/2008 Proudler et al. ................ 726/22

OTHER PUBLICATIONS

Yang Ren, International Search Report, Jan. 3, 2008, 2 pages, PCT/CN2007/000970, The State Intellectual Property Office, the P.R. China, Beijing, China.

Ellen Moyse, International Preliminary Report on Patentability, Sep. 29, 2009, 4 pages, PCT/CN2007/000970, The International Bureau of WIPO, Geneva, Switzerland.

Yang Ren, Written Opinion of the International Searching Authority, Jan. 3, 2008, PCT/CN2007/000970, The State Intellectual Property Office, the P.R. China, Beijing, China.

"TCG Specification Architecture Overview", Revision 1.2, Trusted Computing Group Inc., (Apr. 28, 2004), pp. 1-54.

\* cited by examiner

ENHANCED DIGITAL RIGHT MANAGEMENT FRAMEWORK

CROSS REFERENCE TO RELATED APPLICATION

This patent application is a U.S. National Phase application under 35 U.S.C. §371 of International Application No. PCT/CN2007/000970, filed on Mar. 26, 2007, entitled ENHANCED DIGITAL RIGHT MANAGEMENT FRAMEWORK.

BACKGROUND

Digital Rights Management (generally abbreviated to DRM) system may be a software based system that may refer to software technologies used by publishers or copyright owners to control access to and usage of digital data. DRM system may focus on software security and encryption as a method of solving the issue of unauthorized copying, that is, lock the content and limit its distribution.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for enhanced digital right management. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
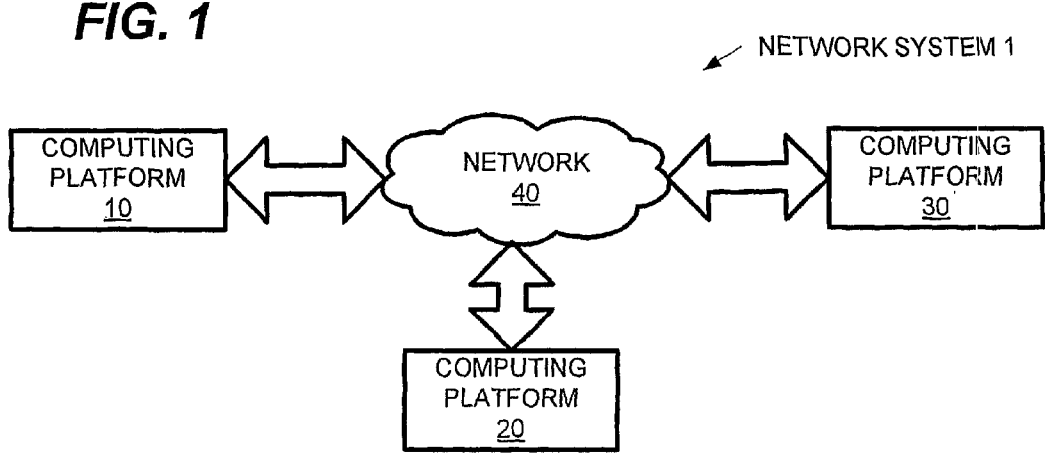
FIG. 1 shows an embodiment of a network system comprising multiple computing platforms.

An embodiment of a network system is shown in FIG. 1. The network system 1 may comprise a plurality of computing platforms 10, 20 and 30 that may connect with each other through a network 40, such as Ethernet, fiber channel or other communication links. In the embodiment, the network system 1 may comprise any number of computing platforms.

Computing platforms on the network system 1 may communicate based upon peer-to-peer module and/or client/server module. Peer-to-peer module may be a type of communication environment that each computing platform on the network could act as a server and share its contents with other computing platform(s) (client) on the network. Client/server module may be another type of communication environment that some computing platforms (server) may be dedicated to serve the other computing platform(s) (client) on the network.

Figure 2:
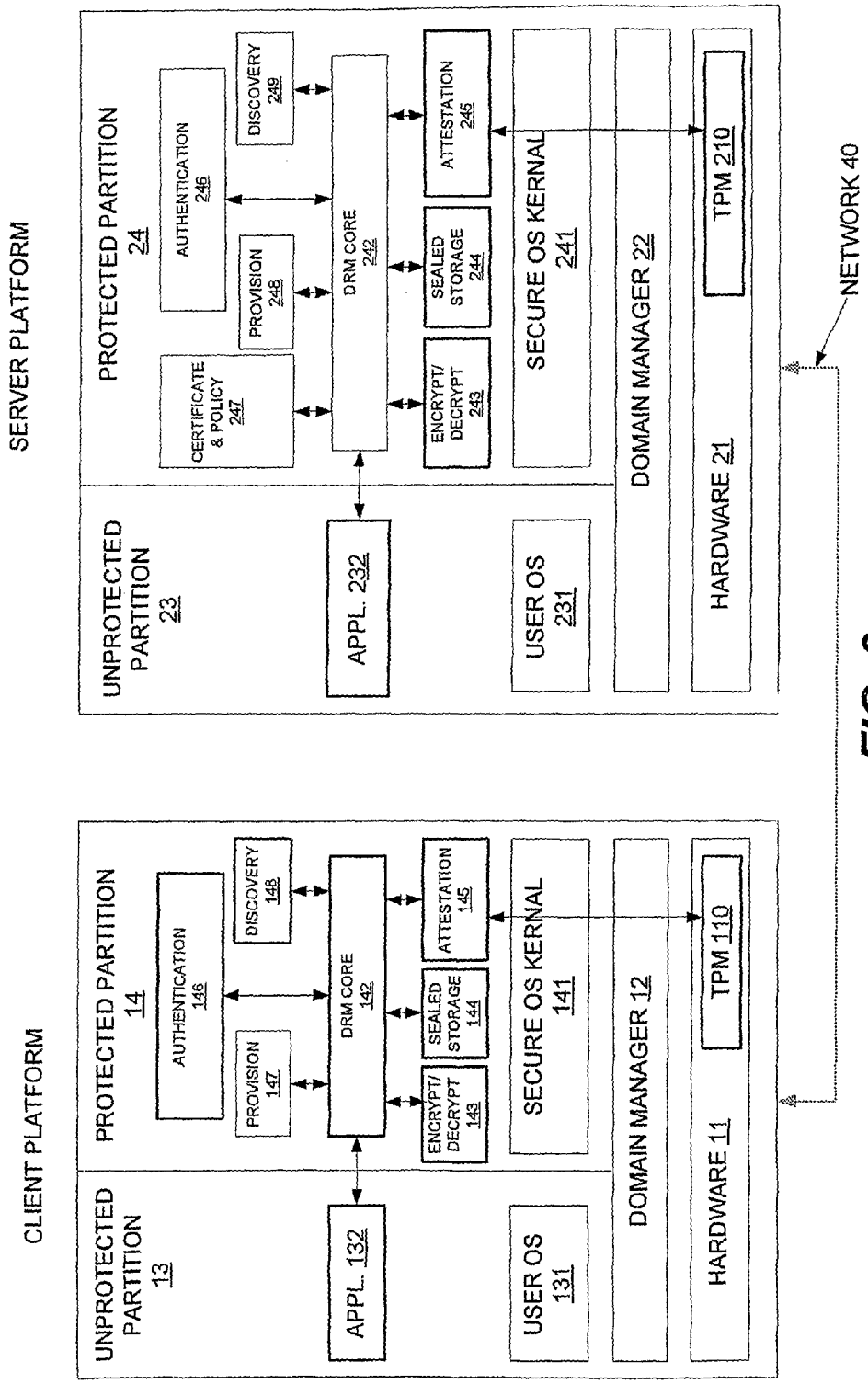
FIG. 2 shows an embodiment of structures of two computing platforms that respectively act as a server platform and a client platform during a session.

An embodiment of structures of two computing platforms that may respectively act as a server platform and a client platform during a session is shown in FIG. 2. As shown, the client platform (e.g., computing platform 10) may comprise hardware 11, domain manager 12, unprotected partition 13 and protected partition 14. Hardware 11 may enable LaGrande technology (LT) that may provide a set of enhanced hardware components designed to protect information from software-based attacks. LaGrande features may be a series of hardware enhancements, to allow for the creation of multiple separated execution partitions (e.g., unprotected partition 13 and protected partition 14). The hardware enhancements may comprise LT-enabled processor (not shown), LT-enabled chipset (not shown), LT-enabled I/O subsystems (not shown), trusted platform module (TPM) 110 and probably other platform components.

Trusted platform module (TPM) 110 may provide the hardware-based mechanism to store or "seal" keys and other data to the platform. TPM may provide the hardware mechanism to report platform attestation. In particular, TPM may measure components (hardware and software) of the platform and securely store the results of the measurements that are not intended to be physically removed or replaced. For example, the results of the measurements may be stored in platform configuration register (PCR) of the TPM. The measurements may be used to determine whether the platform is vulnerable to malicious attacks (e.g., virus attacks).

The client platform may further apply virtualization technology to enable the platform to concurrently run a wide variety of operating systems and applications. The client platform may comprise a domain manager 12 to create a plurality of domains and run on the platform to facilitate for other software the abstraction of one or more domains. Each domain may run a separate operating system instance.

Unprotected partition 13 and protected partition 14 may each be separate domains running separate instances of operating systems, e.g., user OS 131 and secure OS kernel 141. It should be appreciated that the client platform may comprise any number of partitions. Unprotected partition 13 may provide an execution environment that may be identical to standard environment. In this environment, users may be able to run applications 132 and other software just as they do on standard computing platform.

Protected partition 14 may provide a parallel and co-existing environment that may run hardened software that may make use of the hardware-based security foundation, such as LT enabled hardware foundation. Within this environment, different applications may run in isolation, free from being observed or compromised by software running in the unprotected partition 13 and other applications running in the protected partition.

Protected partition 14 may build various software modules over secure OS kernel 141. Secure OS kernel may be LT enabled operating system, such as LT enabled Linux and LT enabled Windows. The software modules may comprise a DRM core 142, an encrypt/decrypt module 143, a sealed storage 144, an attestation module 145, an authentication module 146, a provision module 147 and a discovery module 148.

DRM core 142 may monitor requests or replies from application 132 in unprotected partition 13 or the server platform, schedule and dispatch them among the software modules in the protected partitions. For example, application 132 may send a request of downloading a photo from the server platform. DRIVE core 142 may schedule the request, interact with the server platform and software modules in the protect partitions to download the photo and then reply to application 132.

Encrypt/decrypt module 143 may encrypt and decrypt keys, data or secrets received from DRM core 142. Sealed storage 144 may encrypt and store keys, data or other secrets within hardware on the platform in such a way that these secrets may be only released (decrypted) to an executing environment that is the same as when the secrets were encrypted. Attestation module 145 may work with TPM 110 to enable the platform to provide assurance that the LT protected environment was correctly invoked. A platform may attest to its description of platform characteristics (e.g., the PCR values) that affect the integrity of the platform.

Authenticate module 146 may help the server platform to authenticate an identity of the client platform and/or the user of the client platform. Provision module 147 may act as a provider to provide content and a policy associated to the content to the server platform. Discovery module 148 may request the server platform to discover contents stored in the server platform.

The server platform (e.g., computing platform 20) may comprise hardware 21, domain manager 22, unprotected partition 23 and protected partition 24. Hardware 21 may enable LaGrande technology (LT) as similar as hardware 11 of the client platform. Detailed descriptions of hardware 21 may not be reiterated herein, for simplicity.

The server platform may further apply virtualization technology to enable the platform to concurrently run a wide variety of operating systems and applications. The server platform may comprise a domain manager 22 to create a plurality of domains and run on the platform to facilitate for other software the abstraction of one or more domains. Each domain may run a separate operating system instance.

Unprotected partition 23 and protected partition 24 may each be domains running separate instances of operating systems, e.g., user OS 231 and secure OS kernel 241. It should be appreciated that the server platform may comprise any number of partitions. Unprotected partition 23 may provide an execution environment that may be identical to standard environment. In this environment, users may be able to run applications 232 and other software just as they do on standard computing platform.

Protected partition 24 may provide a parallel and co-existing environment that may run hardened software that may make use of the hardware-based security foundation, such as LT enabled hardware foundation. Within this environment, different applications may run in isolation, free from being observed or compromised by software running in the unprotected partition 23 and other applications running in the protected partition.

Protected partition 24 may build various software modules over secure OS kernel 241. Secure OS kernel may be LT enabled operating system, such as LT enabled Linux and LT enabled Windows. The software modules may comprise a DRM core 242, an encrypt/decrypt module 243, a sealed storage 244, an attestation module 245, an authentication module 246, a certificate & policy module 247, a provision module 248 and a discovery module 249.

DRM core 242 may monitor requests or replies from the client platform, schedule and dispatch them among the software modules in the protected partition 24. Encrypt/decrypt module 243 may encrypt and decrypt keys, data or other secrets received from DRM core 242. Sealed storage 244 may encrypt and store keys, data or other secrets within hardware on the platform in such a way that these secrets may be only released (decrypted) to an executing environment that is the same as when the secrets were encrypted. Attestation module 245 may work with TPM 210 to enable the platform to provide assurance that the LT protected environment was correctly invoked. A platform may attest to its description of platform characteristics (e.g., the PCR values) that affect the integrity of the platform.

Authenticate module 246 may authenticate the identity of the client platform and/or the user of the client platform. Certificate & policy module 247 may generate a certificate and a policy for the client platform under certain circumstances, for example, if the client platform attests to the integrity. Provision module 248 may require the client platform to provide content to the server platform. Discovery module 249 may discover contents stored in the server platform.

Other technologies may implement other embodiments for the structures of the client platform and the server platform. For example, the client platform and the server platform may merge into one computing platform instead of standing in two separate computing platforms.

Figure 3:
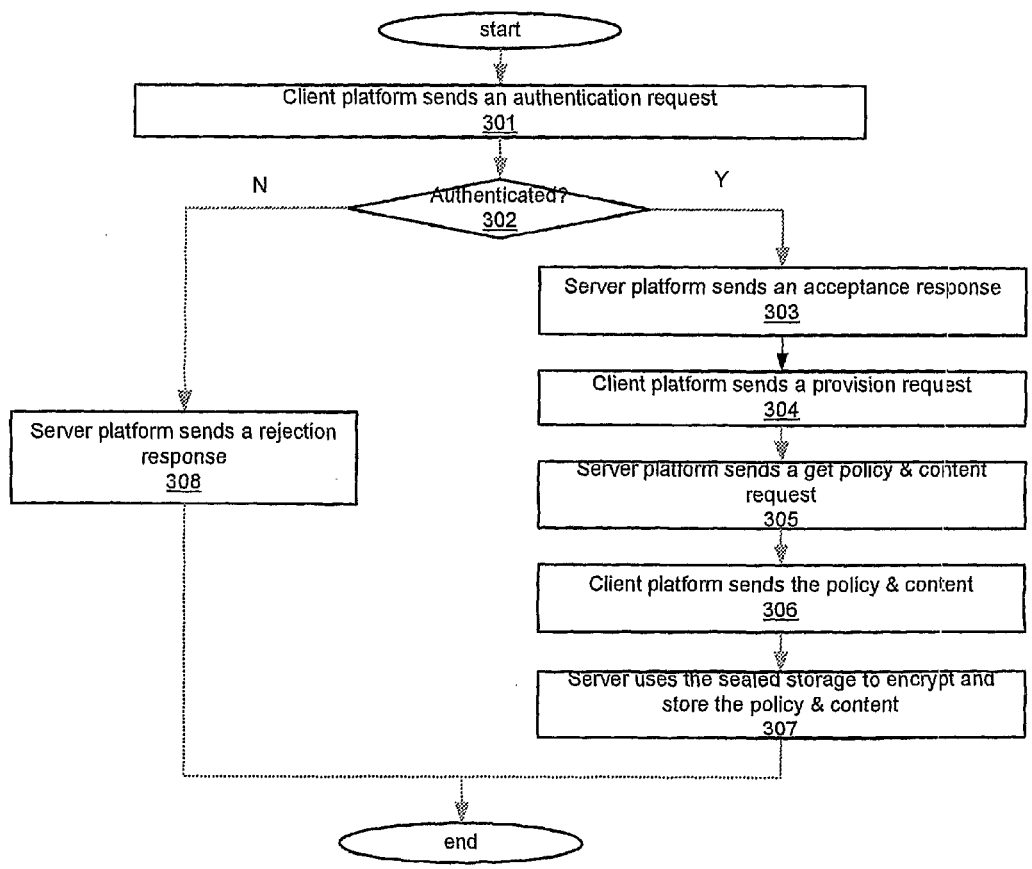
FIG. 3 shows an embodiment of a method of providing content to the server platform.

An embodiment of a method of providing content to a server platform is shown in FIG. 3. In block 301, a client platform (e.g., computing platform 10) may send an authentication request to a server platform (e.g., computing platform 20). The authentication request may comprise information needed for the authentication at the server end, such as user name and password. In block 302, the server platform may check the authentication request and determine if the client platform or the user of the client platform is authenticated. If authenticated, the server platform may send an acceptance response to the client platform in block 303. Then, in block 304, the client platform may send a provision request to the server platform. The provision request may indicate the content and associated policy to be provided by the client platform, for example, the title of the content and/or other features of the content.

In block 305, the server platform may send a request of getting content and policy to the client platform. The policy may state how the content could be used. The policy may further specify rights of using the content for individual users. For example, the policy may specify Tom (user) can download and view the content for five times, or Jane can not download the content, etc. In block 306, the client platform may send the content and associated policy to the server platform. In block 307, the server platform may encrypt and store the policy and content by using the sealed storage.

If in block 302, the client platform or the user of the client platform is not authenticated, then the server platform may send a rejection response to the client platform in block 308.

Figure 4:
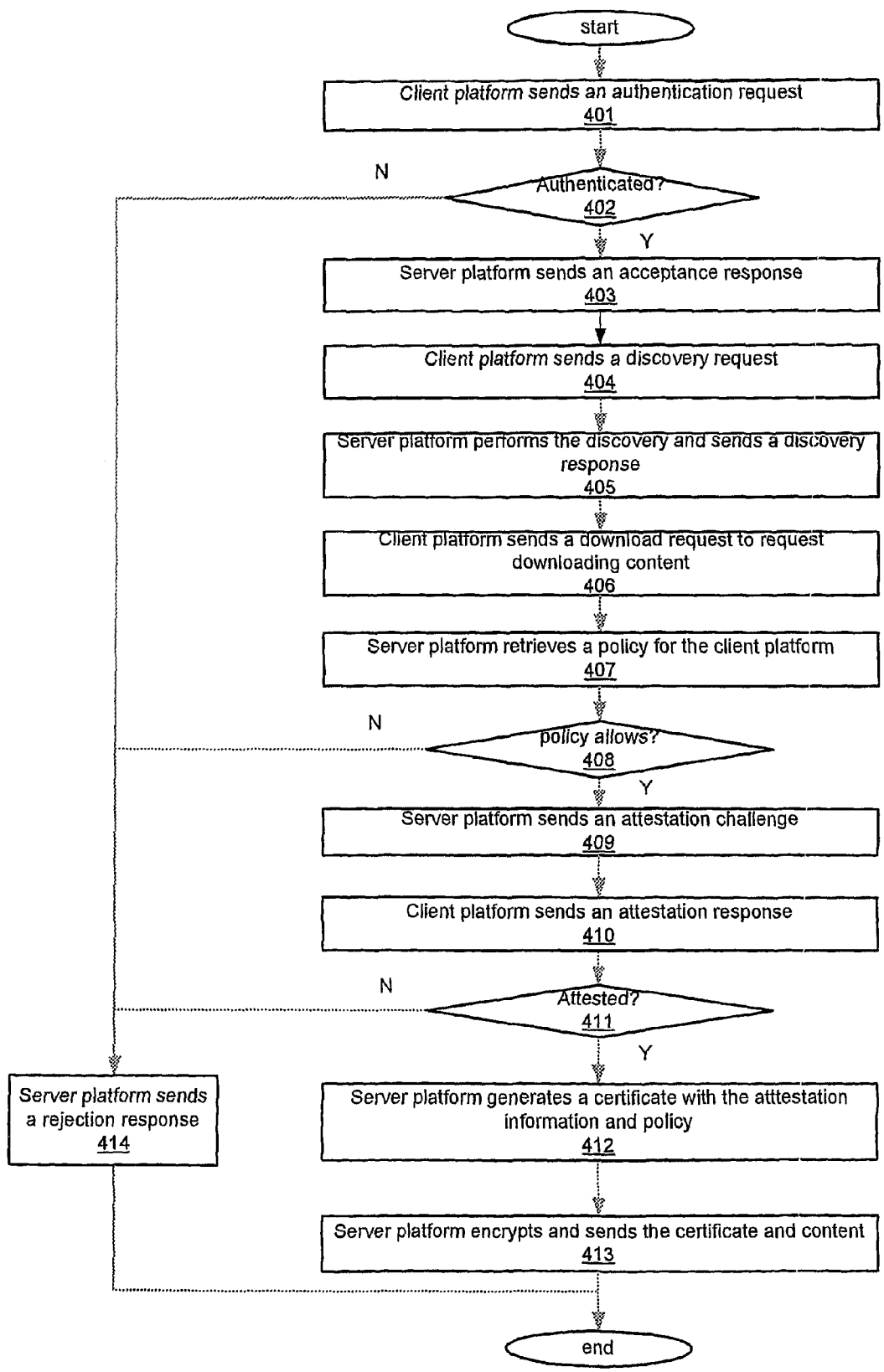
FIG. 4 shows an embodiment of a method of downloading the content from the server platform to the client platform.

An embodiment of a method of downloading the content from the server platform to the client platform is shown in FIG. 4. In block 401, a client platform (e.g., computing platform 30) may send an authentication request to a server platform (computing platform 20). The authentication request may comprise information needed for the authentication at the server end, such as user name and password. In block 402, the server platform may check the authentication request and determine if the client platform or the user of the client platform is authenticated.

If authenticated, the server platform may send an acceptance response to the client platform in block 403. In block 404, the client platform may send a discovery request to the server platform to request the server platform to discover contents stored therein. However, it should be appreciated that the discovery request may request the server platform to discover contents stored anywhere, but not limited to the contents stored in the server platform itself. For example, the discovery request may request the server platform to discover contents stored in a third computing platform. In block 405, the server platform may discover the contents and send a discovery response to the client platform. The discover response may indicate the contents discovered at the server end, for example, content names.

In block 406, the client platform may send a download request to the server platform to request the server to download content. The download request may be formed based upon the discovery response from the server platform. For example, the download request may indicate name of the content to be downloaded based upon the content names contained in the discovery response. In block 407, the server platform may retrieve a policy for the client platform from the sealed storage. The policy may indicate access right of the client platform for the content.

In block 408, the server platform may check if the policy allows downloading the content from the server platform to the client platform. If so, then in block 409, the server platform may send an attestation challenge to check integrity of the client platform. For attestation, TPM module of the client platform may measure components (hardware and/or software) of the client platform to identify vulnerabilities of the platform. The TPM may store results of the measurements in platform configuration register (PCR) within the TPM. The client platform may further send the PCR values (i.e., the measurement results in PCR) to the server platform when registering at the server end. The server platform may store the PCR values in its TPM module for latter use of attesting the integrity of the client platform.

In block 410, the client platform may send an attestation response to the server platform. The attestation response may contain attestation information collected by the TPM module of the client platform. The attestation information may vary with different security levels. For example, if the security level is desired to reach standard application level, then the TPM module of the client platform may measure the components of the client platform from the preboot stage until completion of the execution of a standard application (e.g., application 132 running in the unprotected partition 13) and obtain the attestation information, e.g., $\{H(App)|PK\_TPM\}_{\{TPM\_AIK\}}$. The attestation information in the example may contain two members: H(App) and PK_TPM, which are signed by the TPM_AIK. H(App) may represent a hash value for the standard application, which is calculated by measuring and summing each hash value for each stage (e.g., preboot stage, standard OS stage, standard application stage, etc.). PK_TPM may represent a TPM's public key. TPM_AIK may represent an attestation identity key in the TPM.

For another example, if the security level is desired to reach DRM level, the TPM module of the client platform may measure the components of the client platform from the preboot stage until completion of the execution of DRM application, and obtain the attestation information, e.g., $\{H(DRM)|PK\_TPM\}_{\{TPM\_AIK\}}$. The attestation information in the example may contain two members: H(DRM) and PK_TPM, which are signed by the TPM_AIK. H(DRM) may represent a hash value for the DRM application, which is calculated by measuring and summing each hash value for each stage (e.g., preboot stage, secure OS stage, DRM application stage, etc.). PK_TPM may represent the TPM's public key. TPM_AIK may represent the attestation identity key in the TPM.

In block 411, the server platform may examine if the client platform attests to the integrity by using the attestation information. The server platform may use the TPM's public key to verify the signature on the attestation information. Then, the server platform may extract attestation data from the attestation information, e.g., H(App) or H(DRM), and compare the extracted data with the PCR values stored in the TPM of the server platform in order to determine if the client platform presents a trusted environment. The PCR values may be received from the client platform during a network registration stage.

If the client platform attests to its integrity, then in block 412, the server platform may generate a certificate for the client platform by using the retrieved policy and the attestation information. Then, in block 413, the server platform may encrypt the certificate with the TPM's public key contained in the attestation information and encrypt the content with a content key not known by the client platform. The server platform may send the encrypted certificate and content to the client platform.

However, if it is determined that the client platform or the user of the client platform is not authenticated in block 402, or that the policy does not allow to download the content to the client platform in block 408, or that the client platform does not attest to its integrity in block 411, then the server platform may send a rejection response to the client platform.

Other technologies may implement other embodiments for the downloading method. For example, the server platform may not check if the policy allows the downloading, but download the content as long as the client platform attests to its integrity. For another example, the server platform may encrypt the content with a key known by the client platform, e.g., the TPM's public key. For yet another example, the client platform may send the initial PCR value to the server platform anytime before or when requesting the content downloading, so that the server platform may store the PCR value in its TPM for latter use of attesting the integrity of the client platform.

Figure 5:
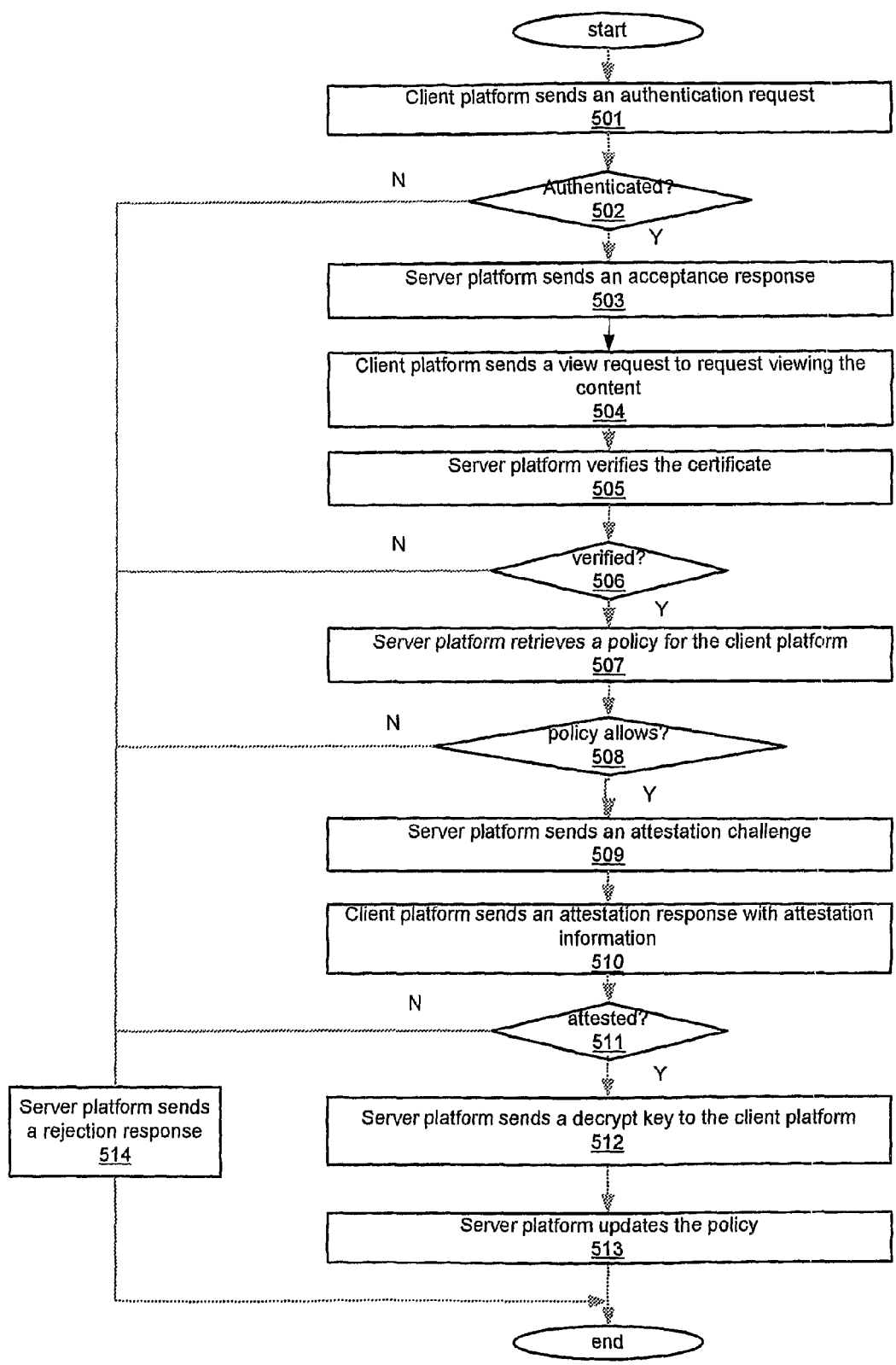
FIG. 5 shows an embodiment of a method of viewing the content at the client platform.

An embodiment of a method of viewing content at a client platform is shown in FIG. 5. In block 501, the client platform (e.g., client platform 30) may send an authentication request to a server platform (computing platform 20). The authentication request may comprise information needed for the authentication at the server end, such as user name and password. In block 502, the server platform may check the authentication request and determine if the client platform or the user of the client platform is authenticated.

If authenticated, the server platform may send an acceptance response to the client platform in block 503. In block 504, the client platform may send a view request to the server platform to ask for permission to view the content. The view request may comprise a content indicator and a certificate. The content indicator may indicate the content of interested, for example, a content name. In block 505, the server platform may verify the certificate. If the received certificate has been encrypted, the server platform may decrypt the certificate before the verification. The server platform may examine the certificate with relevant information stored in a certificate center of the server platform and determine if the certificate is verified. If it is verified (block 506), then the server platform may retrieve a policy for the client platform (block 507) and determine if the policy allows the client platform to view the content (block 508). For example, the policy may indicate how many times (or how often) the client platform is allowed to view the content. If allows, then the server platform may send an attestation challenge to the client platform to verify if the client platform attests to its integrity (block 509).

In block 510, the client platform may send an attestation response to the server platform. The attestation response may contain attestation information collected by the TPM of the client platform. The attestation information may vary with different security levels. For example, if the security level is desired to reach standard application level, then the TPM of the client platform may obtain the attestation information such as $\{H(App)|PK\_TPM\}_{\{TPM\_AIK\}}$. For another example, if the security level is desired to reach DRM level, the TPM of the client platform may obtain the attestation information such as $\{H(DRM)|PK\_TPM\}_{\{TPM\_AIK\}}$. In block 511, the server platform may examine if the client platform attests to the integrity by using the attestation information and the PCR values previously received from the client platform, e.g., before or when the client platform requesting to download the content. If the client platform attests to its integrity, then in block 512, the server platform may send a key to the client platform so that the client platform may decrypt and view the content. In block 513, the server platform may further update the policy if needed. For example, if the policy indicates how many times the client platform is allowed to view the content, the server platform may update the times in block 513.

However, if it is determined that the client platform or the user of the client platform is not authenticated in block 502, or that the certificate is not verified in block 506, or that the policy does not allow the client platform to view the content in block 508, or that the client platform does not attest to its integrity in block 511, then the server platform may send a rejection response to the client platform.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A non-transitory machine-readable medium comprising a plurality of instructions which when executed result in a server platform:
   receiving, from a client platform, a request of downloading content;
   receiving, from the client platform, first attestation information comprising a measurement result of a hardware component and a software component of the client platform;
   examining if the client platform attests to a client platform characteristic that affects integrity of the client platform by comparing the first attestation information with a value provided by the client platform;
   encrypting and downloading the content to the client platform, if the client platform attests to the client platform characteristic;
   receiving, from the client platform, a request of viewing the content;
   receiving, from the client platform, second attestation information comprising another measurement result of the hardware component and the software component of the client platform, wherein the another measurement result comprises a hash value;
   examining if the client platform attests to the client platform characteristic that affects integrity of the client platform by comparing the second attestation information with the value; and
   sending a content key to the client platform if the client platform attests to the client platform characteristic.

2. The non-transitory machine-readable medium of claim 1, wherein the plurality of instructions further result in the server platform:
   checking if a predetermined policy allows downloading the content from the server platform to the client platform.

3. The non-transitory machine readable medium of claim 2, wherein the plurality of instructions that result in the server platform encrypting and downloading, further result in the server platform:
   encrypting and downloading the content to the client platform, if the predetermined policy allows downloading the content from the server platform to the client platform.

4. The non-transitory machine-readable medium of claim 1, wherein the content is encrypted with a content key owned by the server platform.

5. The non-transitory machine readable medium of claim 1, wherein the client platform characteristic reflects whether the client platform is vulnerable to malicious attacks.

6. The non-transitory machine readable medium of claim 1, wherein the first attestation information comprises a hash value as the measurement result of the hardware component and the software component of the client platform.

7. The non-transitory machine-readable medium of claim 1, wherein the plurality of instructions further result in the server platform:
   checking if a predetermined policy allows the client platform to view the content.

8. The non-transitory machine readable medium of claim 7, wherein the plurality of instructions that result in the server platform sending, further result in the server platform:
   sending the content key to the client platform, if the predetermined policy allows the client platform to view the content.

9. A non-transitory machine-readable medium comprising a plurality of instructions which when executed result in a client platform:

sending, to a server platform, a request of downloading content;

sending, to the server platform, first attestation information comprising a measurement result of a hardware component and a software component of the client platform;

receiving, from the server platform, the content that is encrypted with a content key owned by the server platform, if the server platform determines that the client platform attests to a client platform characteristic that affects integrity of the client platform by comparing the first attestation information with a value provided by the client platform;

sending, to the server platform, a request of viewing the content;

sending, to the server platform, second attestation information comprising another measurement result of the hardware component and the software component of the client platform, wherein the another measurement result comprises a hash value; and receiving, from the server platform, the content key to decrypt the content, if the server platform determines that the client platform attests to the client platform characteristic that affects the integrity of the client platform by comparing the second attestation information with the value.

10. The non-transitory machine-readable medium of claim 9, wherein the plurality of instructions further result in the client platform:

measuring the hardware component and the software component of the client platform on whether the component is vulnerable to a malicious attack, to provide the value;

signing the value with a key owned by the client platform, to provide the client platform characteristic; and sending the value to the server platform.

11. The non-transitory machine-readable medium of claim 9, wherein:

the first attestation information comprises a hash value as the measurement result of the hardware component and the software component of the client platform.

* * * * *